US008265620B2

United States Patent
Hong et al.

(12) United States Patent
(10) Patent No.: US 8,265,620 B2
(45) Date of Patent: Sep. 11, 2012

(54) APPARATUS AND METHOD FOR MEASURING UPLINK THERMAL NOISE POWER AND UPLINK INTERFERENCE POWER IN WIRELESS COMMUNICATION SYSTEM

(75) Inventors: Ki-Seob Hong, Suwon-si (KR); Seung-Joo Maeng, Seongnam-si (KR); Byung-Chan Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 12/658,018

(22) Filed: Feb. 1, 2010

(65) Prior Publication Data

US 2010/0197297 A1    Aug. 5, 2010

(30) Foreign Application Priority Data

Feb. 2, 2009  (KR) .................. 10-2009-0007901

(51) Int. Cl.
*H04W 24/00* (2009.01)

(52) U.S. Cl. ........................................ 455/424; 370/252
(58) Field of Classification Search .................. 455/424; 370/252

See application file for complete search history.

(56) References Cited

U.S. PATENT DOCUMENTS

| 7,522,919 B2 * | 4/2009 | Yoon et al. ..................... 455/428 |
| 2006/0176815 A1 * | 8/2006 | Picot et al. ..................... 370/235 |
| 2008/0130483 A1 * | 6/2008 | Khandekar et al. ........... 370/208 |

* cited by examiner

*Primary Examiner* — Rafael Pérez-Gutiérrez
*Assistant Examiner* — German Viana Di Prisco

(57) ABSTRACT

An apparatus for use in a base station capable of checking whether a frequency is illegally used in a wireless communication system are provided. Operations of the base station for checking whether the frequency is illegally used includes setting a silence interval in which a resource is not allocated to a terminal, using silence interval setting information provided from a system manager; when the silence interval arrives, measuring RSSI; and transmitting the RSSI to the system manager to examine at least one of a frequency illegal use and a reception path error using the RSSI.

17 Claims, 6 Drawing Sheets

APPARATUS AND METHOD FOR MEASURING UPLINK THERMAL NOISE POWER AND UPLINK INTERFERENCE POWER IN WIRELESS COMMUNICATION SYSTEM

CROSS REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Feb. 2, 2009 and assigned Serial No. 10-2009-0007901, the entire disclosure of which is hereby incorporated by reference.

TECHNICAL FIELD OF THE INVENTION

The present invention relates generally to a wireless communication system. More particularly, the present invention relates to an apparatus and a method for measuring an uplink thermal noise power and an uplink interference power in the wireless communication system.

BACKGROUND OF THE INVENTION

A fourth generation (4G) communication system is under development to offer services of various Quality of Service (QoS) levels to users at a transfer rate of about 100 Mbps. In particular, the 4G communication systems are advancing to support high-speed services by guarantying mobility and QoS in broadband wireless communication systems such as wireless Local Area Network (LAN) systems and wireless Metropolitan Area Network (MAN) systems.

To support the broadband transmission network in the physical channel, the wireless communication system employs Orthogonal Frequency Division Multiplexing (OFDM)/Orthogonal Frequency Division Multiple Access (OFDMA) scheme.

Using the OFDM/OFDMA scheme, the wireless communication system transmits signals by maintaining orthogonality between a plurality of subcarriers and thus features good frequency use efficiency and robustness against the multipath fading. By using the OFDM/OFDMA scheme, the wireless communication system can achieve the optimum transmission efficiency in the high-speed data transmission.

The wireless communication system based on the OFDM/OFDMA scheme needs to calculate RoT or IoT. However, being not able to measure a thermal noise power, the calculation of the RoT or the IoT is infeasible.

In addition, the wireless communication system provides no apparatus and method for determining whether or not the frequency band licensed to a wireless communication provider is illegally used. As a result, the wireless communication system cannot block the illegal use of the frequency band.

SUMMARY OF THE INVENTION

To address the above-discussed deficiencies of the prior art, it is a primary object to provide at least the advantages described below. Accordingly, an aspect of the present invention is to provide an apparatus and a method for measuring an uplink thermal noise power at a base station in a wireless communication system.

Another aspect of the present invention is to provide an apparatus and a method for calculating RoT or IoT using a Received Signal Strength Indication (RSSI) measured over a silence interval at a base station in a wireless communication system.

Yet another aspect of the present invention is to provide an apparatus and a method for determining whether a frequency is illegally used in a wireless communication system.

Still another aspect of the present invention is to provide an apparatus and a method for determining whether a frequency is illegally used using RSSI measured over a silence interval in a wireless communication system.

A further aspect of the present invention is to provide an apparatus and a method for setting a silence interval under control of a system manager at a base station in a wireless communication system.

According to one aspect of the present invention, a method of a base station for checking whether a frequency is illegally used in a wireless communication system, includes setting a silence interval in which a resource is not allocated to a terminal, using silence interval setting information provided from a system manager; when the silence interval arrives, measuring RSSI; and transmitting the RSSI to the system manager to examine at least one of a frequency illegal use and a reception path error using the RSSI. The RSSI measured in the silence interval is recognized as an uplink interference power.

According to another aspect of the present invention, an apparatus of a base station for checking whether a frequency is illegally used in a wireless communication system includes a wired interface that transmits and receives signals to and from a system manager connected over a wired network; a scheduler that sets a silence interval in which a resource is not allocated to a terminal, uses silence interval setting information provided via the wired interface, and transmits RSSI measured at an RSSI measurer in the silence interval, to the system manager; and the RSSI measurer that measures the RSSI when the silence interval arrives. The RSSI measured in the silence interval is recognized as an uplink interference power.

According to yet another aspect of the present invention, a wireless communication system for examining whether a frequency is illegally used includes a system manager that transmits silence interval setting information to at least one base station; the at least one base station for setting a silence interval in which a resource is not allocated to a terminal, uses the silence interval setting information, and when the silence interval arrives, measures RSSI and transmits the RSSI to the system manager; and the system manager that examines at least one of frequency illegal use and a reception path error using the RSSI received from the at least one base station. The RSSI measured in the silence interval is recognized as an uplink interference power.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Exemplary embodiments of the present invention provide a technique for measuring an uplink thermal noise power and an uplink interference power at a base station of a wireless communication system.

Figure 1:
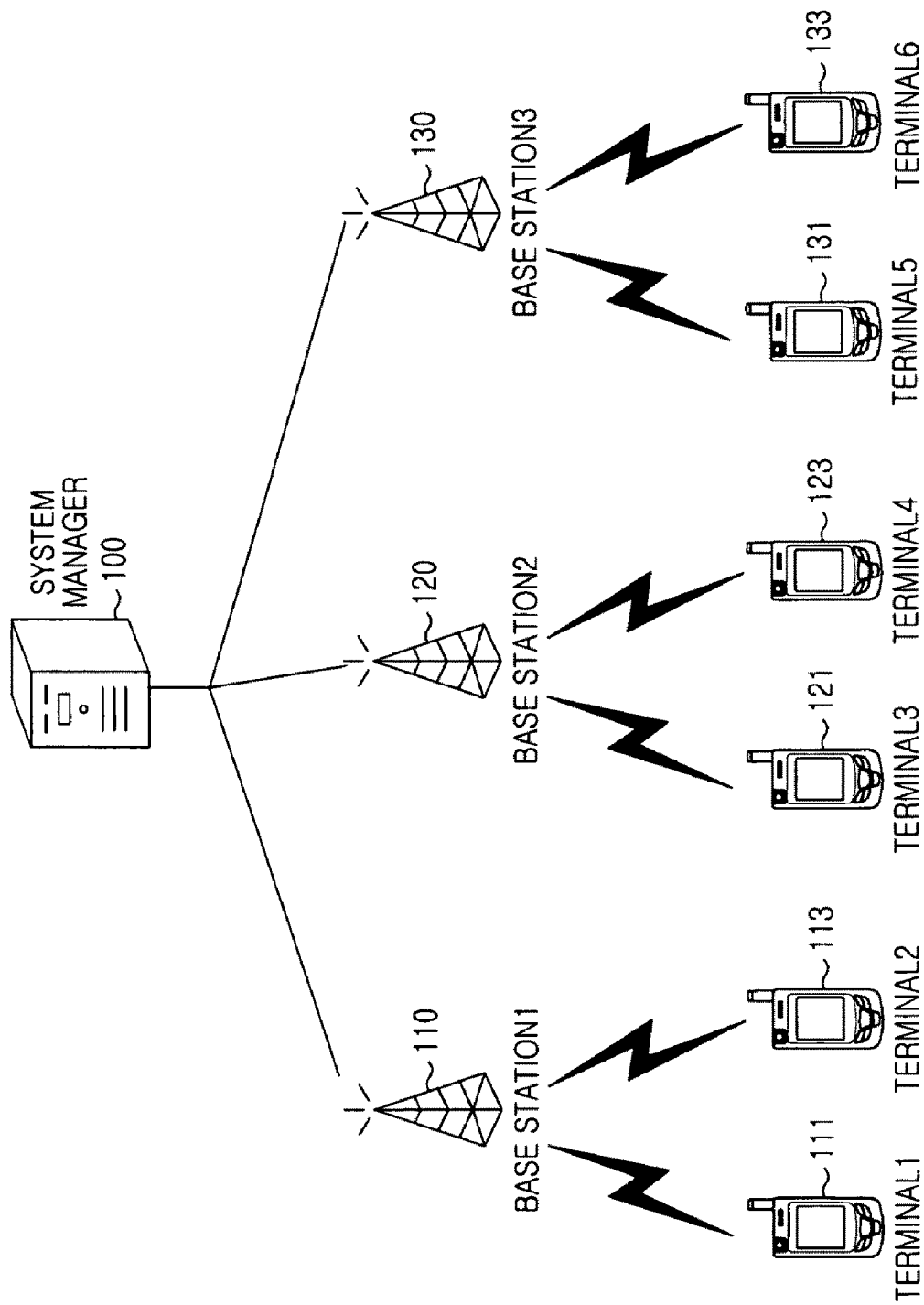
FIG. 1 illustrates a wireless communication system according to an exemplary embodiment of the present invention.

Hereinafter, it is assumed that the wireless communication system is constituted as shown in FIG. 1.

FIG. 1 depicts the wireless communication system according to an exemplary embodiment of the present invention.

The wireless communication system of FIG. 1 includes a system manager 100, base stations 110, 120 and 130, and terminals 111, 113, 121, 123, 131 and 133.

The system manager 100 controls the base stations 110, 120 and 13 to set a silence interval. For example, the system manager 100 sends a silence interval setting signal including silence interval setting information to the base stations 110, 120 and 130. The silence interval setting signal includes the silence interval setting information as shown in Table 1. minute

TABLE 1

| Items | Descriptions |
| --- | --- |
| Start Frame Number | when receiving a measurement message, indicates a location for all of base stations to start the measurement in synchronization. Receives 'year/month/day hour:minute:second' as input and converts to 5 ms frame number based on GPS time. |
| M (UL RSSI Report Interval) | when receiving the measurement message, indicates an interval of the measurement based on Start frame number and the result output. |
| N (UL RSSI Measurement Interval) | when receiving the measurement message, indicates an interval including one UL silence subframe based on Start frame number. |
| R (Report Repetition) | when receiving the measurement message, indicates a number of repetitions of UL RSSI report interval based on Start frame number. The base station can calculate an end time of measurement function according to the number of repetitions. The number of repetitions set to zero implies that the number of repetitions is infinite. As for a numeral other than zero, the measurement function is ended after carrying out for the number of times of the repetition corresponding to the set value. |

Start Frame Number indicates the silence interval start point information of the base stations, M indicates period information of the base stations which set the silence interval, for reporting of the measurement information, R indicates the number of repetitions for the base stations which set the silence interval, for reporting of the measurement information, and N indicates a period of the base stations for measuring Received Signal Strength Indication (RSSI). That is, N indicates the period of the base stations for setting the silence interval to measure the RSSI.

The base stations 110, 120 and 130 define the silence interval according to the silence interval setting signal fed from the system manager 100. For example, the base stations 110, 120 and 130 schedule the silence interval using a GPS time and the silence interval setting information of the silence interval setting signal. In other words, the base stations 110, 120 and 130 schedule not to allocate uplink resources of the silence interval to the terminals 111, 113, 121, 123, 131 and 133. Herein, the base stations 110, 120 and 130 set the silence interval in synchronization with other base stations.

The terminals 111, 113, 121, 123, 131 and 133 do not send signals during the silence interval according to the scheduling of the base stations 110, 120 and 130. Hence, the base stations 110, 120 and 130 can utilize the RSSI measured in the silence interval as an uplink thermal noise power. That is, the base stations 110, 120 and 130 can calculate RoT or IoT using the uplink thermal noise power.

The base stations 110, 120 and 130 may use the RSSI measured over the silence interval as an uplink interference power. In so doing, the base stations 110, 120 and 130 send the measured RSSI to the system manager 100 so as to determine whether the frequency is illegally used based on the uplink interference power. For example, the base stations 110, 120 and 130 send the RSSI measured over the silence interval to the system manager 100 at every report period determined according to the silence interval setting information.

The system manager 100 can determine whether the frequency band is illegally used, by comparing the RSSI provided from the base stations 110, 120 and 130 with a first reference value. For example, the system manager 100 determines whether or not the frequency band is illegally used every time the RSSI is received from the base stations 110, 120 and 130. Alternatively, the system manager 100 may determine whether the frequency band is illegally used, based on an average of the RSSI received from the base stations 110, 120 and 130 over a certain time. Herein, the first reference value can be set to the sum of a sum noise and a reference variable.

The system manager 100 may check for a reception path error of the base stations 110, 120 and 130 by comparing the RSSI received from the base stations 110, 120 and 130 with a second reference value. For example, for every reception of the RSSI from the base stations 110, 120 and 130, the system manager 100 checks for the reception path error. Alternatively, the system manager 100 may check for the reception path error using the average of the RSSI provided from the base stations 110, 120 and 130 over a certain time. Herein, the second reference value can be set to a difference of the sum noise and the reference variable.

In this exemplary embodiment, the base stations 110, 120 and 130 define the silence interval under the control of the system manager 100.

Under the control of the system manager 100, the base stations 110, 120 and 130 may release the silence interval. When determining the measurement of the RSSI is unnecessary, the system manager 100 sends a silence interval release signal to the base stations 110, 120 and 130 to stop the measurement of the RSSI.

The base stations 110, 120 and 130, receiving the silence interval release signal from the system manager 100, release the silence interval according to the GPS time and the silence interval release information of the silence interval release signal.

Now, descriptions provide an operation method of the base station for calculating RoT or IoT using the silence interval scheduled under the control of the system manager.

Figure 2:
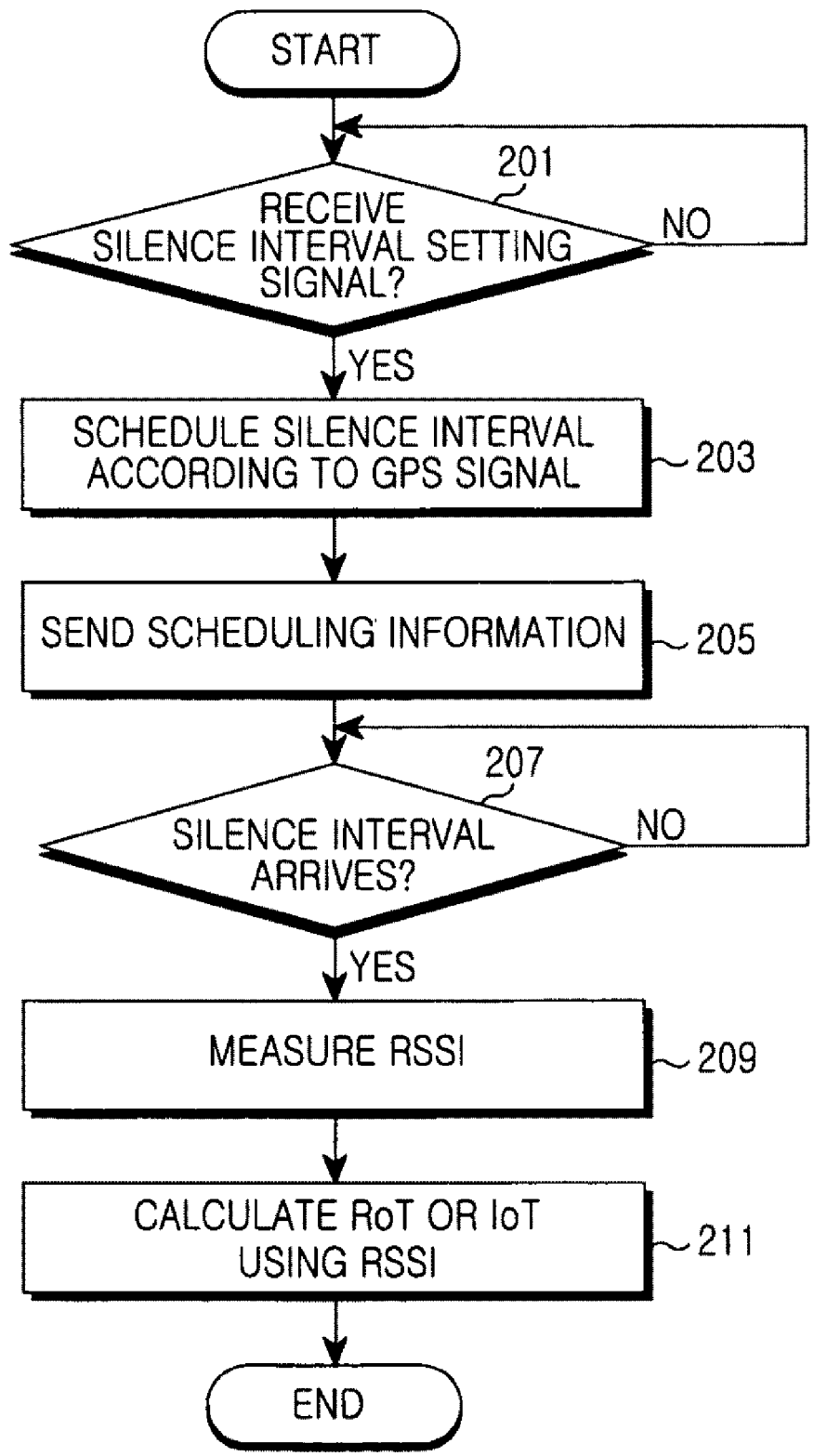
FIG. 2 illustrates a method of a base station for measuring an uplink thermal noise power according to an exemplary embodiment of the present invention.

FIG. 2 illustrates a method of the base station for measuring the uplink thermal noise power according to an exemplary embodiment of the present invention.

In step 201, the base station checks whether the silence interval setting signal is received from the system manager. Herein, the silence interval setting signal includes at least one silence interval setting information of the silence interval start point information, the measurement report period information, the silence interval setting period information, and the measurement report repetition time information as shown in Table 1.

When receiving the silence interval setting signal from the system manager, the base station schedules the silence interval using the GPS time and the silence interval setting information of the silence interval setting signal in step 203. That is, the base station does not allocate the uplink resources of the silence interval to the terminals through the scheduling. In so doing, the base station schedules silence interval before the silence interval start frame by taking into account the uplink scheduling delay as given by Equation 1

$$StartSfn = StartFrameNumber - UlSchedulingDelay \quad [Eqn. 1]$$

In Equation 1, StartSfn denotes a start point for scheduling the silence interval at a scheduler, StartFrameNumber denotes the silence interval start point provided from the system manager, and UlSchedulingDelay denotes the uplink scheduling delay.

The base station can calculate the scheduling end point information of the silence interval by applying the silence interval setting information provided from the system manager to Equation 2

$$EndSfn = StartFrameNumber + RssiReport\,Interval \times ReportRepetition - UlSchedulingDelay \quad [Eqn. 2]$$

In Equation 2, EndSfn denotes a scheduling end point for the silence interval at the scheduler, StartFrameNumber denotes the silence interval start point provided from the system manager, RssiReportInterval indicates the period for reporting the RSSI measured in the silence interval to the system manager, ReportRepetition denotes the number of repetitions for reporting the RSSI measured in the silence interval to the system manager, and UlSchedulingDelay denotes the uplink scheduling delay.

The scheduler of the base station can confirm a start frame corresponding to the scheduling time of the silence interval in every silence interval setting period based on Equation 3:

$$SfnMeasurementFrame = SfnReportFrame + SfnCount \times RssiMeasurementInterval \quad [Eqn. 3]$$

In Equation 3, SfnMeasurementFrame denotes the start frame for scheduling the silence interval within the silence interval setting period at the scheduler, SfnReportFrame denotes the start frame of the measurement report period at the scheduler in consideration of the scheduling delay, RssiMeasurementInterval denotes the silence interval setting period provided from the system manager, and SfnCount denotes a variable for uniformly defining the silence interval according to the absolute time. Herein, SfnReportFrame is given by Equation 4:

$$Sfn\,Report\,Frame = StartSfn + SfnReport\,Count \times RssiReport\,Interval \quad [Eqn. 4]$$

In Equation 4, SfnReportFrame denotes the start frame of the measurement report period at the scheduler in consideration of the scheduling delay, StartSfn denotes a scheduling start time of the silence interval, RssiReportInterval denotes a period for reporting the RSSI measured in the silence interval to the system manager, and SfnReportCount denotes a variable for uniformly scheduling the silence interval at the scheduler according to the absolute time and the measurement report period. Herein, SfnReportCount is given by Equation 5:

$$SfnReportCount = \mathrm{floor}\left(\frac{FrameNumber - StartSfn}{RssiReport\,Interval}\right) \quad [Eqn. 5]$$

In Equation 5, SfnReportCount denotes the variable for uniformly scheduling the silence interval at the scheduler according to the absolute time and the measurement report period, FrameNumber denotes a current frame number, StartSfn denotes the scheduling start point of the silence interval, and RssiReportInterval denotes the period for reporting the RSSI measured in the silence interval to the system manager.

The variable SfnCount for uniformly defining the silence interval according to the absolute time in Equation 3 is given by Equation 6:

$$SfnCount = \mathrm{floor}\left(\frac{FrameNumber - SfnReportFrame}{RssiMeasurementInterval}\right) \quad [Eqn. 6]$$

In Equation 6, SfnCount denotes the variable for uniformly defining the silence interval according to the absolute time, FrameNumber denotes the current frame number, SfnReportFrame denotes the start frame of the measurement report period at the scheduler in consideration of the scheduling delay, and RssiMeasurementInterval denotes the silence interval setting period provided from the system manager.

In step 205, the base station transmits the scheduling information to the terminals in the service coverage.

In step 207, the base station checks whether the silence interval arrives according to the scheduling information of the silence interval. Based on the time calculated from Equation 7 according the measurement delay of the RSSI, the base station checks whether the silence interval arrives.

$$StartMfn = StartFrameNumber + UlMeasurementDelay \quad [Eqn. 7]$$

In Equation 7, StartMfn denotes a measurement start point of the RSSI at an RSSI measurer, StartFrameNumber denotes the silence interval start point provided from the system manager, and UlMeasurementDelay denotes a RSSI measurement delay.

According to the measurement start point of the RSSI calculated based on Equation 7, the base station determines a measurement start frame of the RSSI based on Equation 8:

$$MfnMeasurementFrame = MfnReportFrame + MfnCount \times RssiMeasurementInterval \quad [Eqn. 8]$$

In Equation 8, MfnMeasurementFrame denotes the frame for starting the RSSI measurement at the RSSI measurer, MfnReportFrame denotes a start frame for the RSSI measurer to report the RSSI measured in the silence interval to the system manager, RssiMeasurementInterval denotes the silence interval setting period provided from the system manager, and MfnCount denotes a variable for uniformly measuring the RSSI at the RSSI measurer according to the absolute time. Herein, MfnReportFrame is given by Equation 9:

$$MfnReportFrame = StartMfn + MfnReportCount \times RssiReportInterval \quad [Eqn. 9]$$

In Equation 9, MfnReportFrame denotes the start frame for the RSSI measurer to report the RSSI measured in the silence interval to the system manager, StartMfn denotes a measurement start point of the RSSI at the RSSI measurer, RssiReportInterval denotes a period for reporting the RSSI measured in the silence interval to the system manager, and MfnReportCount denotes a variable for the RSSI measurer to uniformly report the RSSI based on the absolute time. Herein, MfnReportCount is given by Equation 10:

$$MfnReportCount = floor\left(\frac{FrameNumber - StartMfn}{RssiReportInterval}\right) \quad [Eqn. 10]$$

In Equation 10, MfnReportCount denotes the variable for the RSSI measurer to uniformly report the RSSI according to the absolute time, FrameNumber denotes the current frame number, StartMfn denotes the measurement start point of the RSSI at the RSSI measurer, and RssiReportInterval denotes the period for reporting the RSSI measured in the silence interval to the system manager.

The variable MfnCount for uniformly measuring the RSSI at the RSSI measurer based on the absolute time in Equation 8 is given by Equation 11:

$$MfnCount = floor\left(\frac{FrameNumber - MfnReportFrame}{RssiMeasurementInterval}\right) \quad [Eqn. 11]$$

In Equation 11, MfnCount denotes the variable for uniformly measuring the RSSI at the RSSI measurer according to the absolute time, FrameNumber denotes the current frame number, MfnReportFrame denotes the start frame for the RSSI measurer to report the RSSI measured in the silence interval to the system manager, and RssiMeasurementInterval denotes the silence interval setting period provided from the system manager.

The base station measures the RSSI from the measurement start point of the RSSI calculated based on Equation 7 to the measurement end point of the RSSI calculated based on Equation 12:

$$EndMfn = StartFrameNumber + RssiReportInterval \times ReportRepetition + UlMeasurementDelay \quad [Eqn 12]$$

In Equation 12, EndMfn denotes the measurement end point of the RSSI at the RSSI measurer, StartFrameNumber denotes the silence interval start point provided from the system manager, RssiReportInterval denotes the period for reporting the RSSI measured in the silence interval to the system manager, ReportRepetition denotes the number of repetitions with respect to the report period, and UlMeasurementDelay denotes the RSSI measurement delay.

When the silence interval arrives in step 207, the base station measures the RSSI in step 209.

In step 211, the base station calculates RoT or IoT using the RSSI measured in step 209. Since the base station does not allocate the resources to the terminals in the silence interval, it uses the RSSI measured in the silence interval as the uplink thermal noise power. Hence, the base station calculates RoT or IoT using the uplink thermal noise power measured in the step 209.

Next, the base station finishes this process.

The following explains an operating method of the base station for measuring the uplink interference power using the silence interval scheduled under the control of the system manager.

Figure 3:
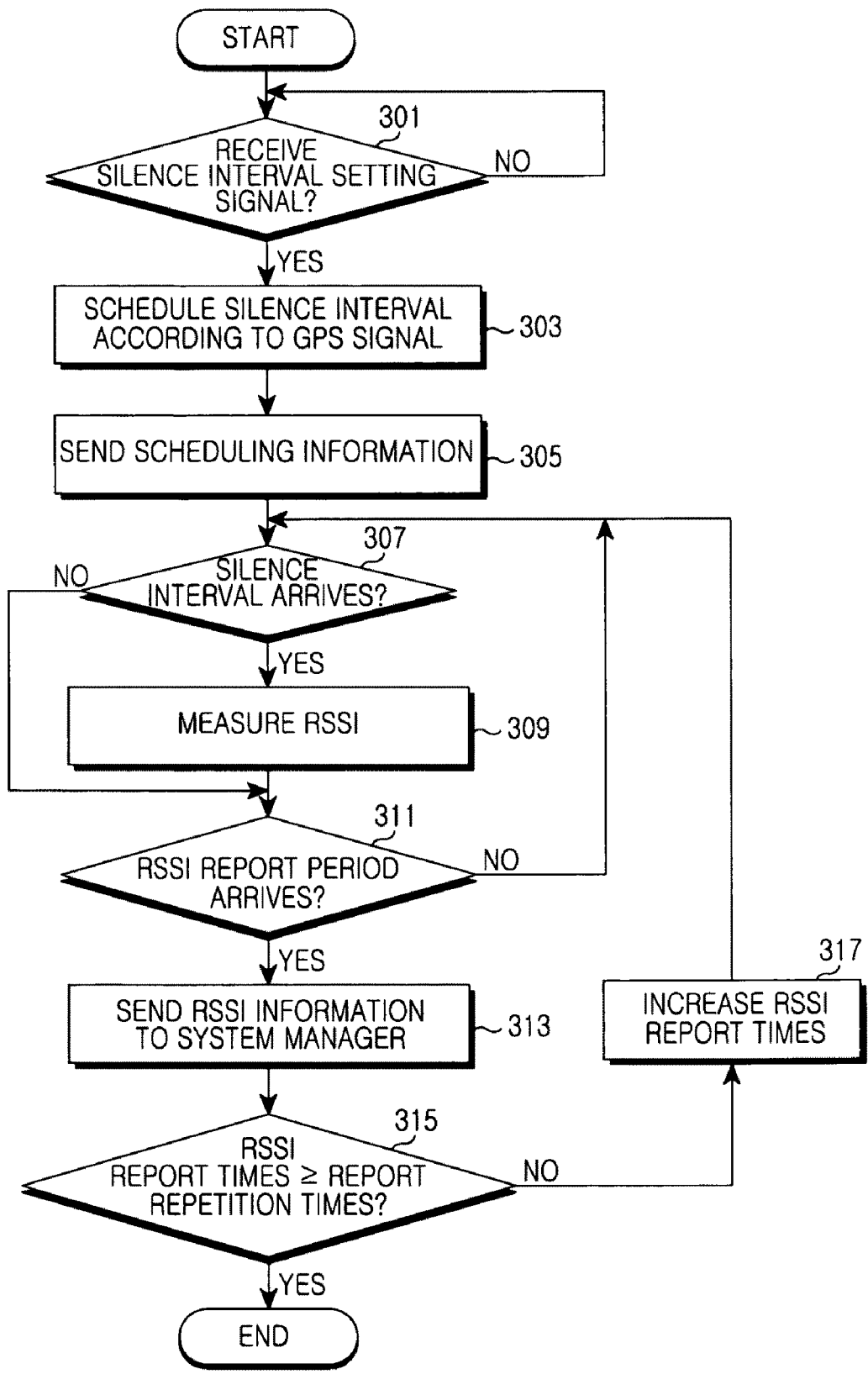
FIG. 3 illustrates a method of the base station for determining whether a frequency band is illegally used according to an exemplary embodiment of the present invention.

FIG. 3 illustrates a method of the base station for determining whether the frequency band is illegally used according to an exemplary embodiment of the present invention.

In step 301, the base station checks whether the silence interval setting signal is received from the system manager. Herein, the silence interval setting signal includes the silence interval setting information such as silence interval start point information, measurement report period information, silence interval setting period information, and measurement report repetition time information as shown in Table 1.

When receiving the silence interval setting signal from the system manager, the base station schedules the silence interval using the GPS time and the silence interval setting information of the silence interval setting signal in step 303. That is, the base station does not allocate the uplink resources of the silence interval to the terminals through the scheduling. The base station schedules the silence interval before the silence interval start frame by taking into account the uplink scheduling delay as expressed in Equation 1. The base station schedules the silence interval up to the time point calculated from Equation 2.

In step 305, the base station transmits the scheduling information to the terminals in the service coverage.

In step 307, the base station checks whether the silence interval arrives according to the scheduling information of the silence interval. For example, the base station can confirm the start frame for measuring the RSSI by applying the silence interval setting information fed from the system manager to Equation 8.

When the silence interval does not arrive, the base station checks whether the RSSI report period arrives in step 311. For example, the base station can identify the start frame for reporting the RSSI measured in the silence interval to the system manager by applying the silence interval setting information fed from the system manager to Equation 9.

When the silence interval arrives in step 307, the base station measures the RSSI in step 309. Since the base station does not allocate the resources to the terminals in the silence interval, it uses the RSSI measured in the silence interval as the uplink interference power.

In step 311, the base station checks whether the RSSI report period arrives.

When the RSSI report period does not arrive in step 311, the base station goes back to step 307 and determines whether the silence interval arrives based on the scheduling information of the silence interval.

When the RSSI report period arrives in step 311, the base station transmits the RSSI measured over the silence interval in step 309 to the system manager in step 313. That is, the base station transmits the RSSI measured in the silence interval used as the uplink interference power, to the system manager so that the system manager can determine whether the frequency is illegally used. In so doing, the base station transmits the RSSI measured in the silence interval from the time point substantially calculated from Equation 9 according to the RSSI measurement delay, to the system manager.

In step 315, the base station compares the RSSI report time with the report repetition times to determine whether to continue the scheduling of the silence interval.

When the RSSI report time is smaller than the report repetition times in step 315, the base station increases the RSSI report time by one in step 317.

Next, the base station returns to step 307 and checks whether the silence interval arrives according to the scheduling information of the silence interval.

When the RSSI report time is greater than or equal to the report repetition times in step 315, the base station finishes this process.

Figure 4:
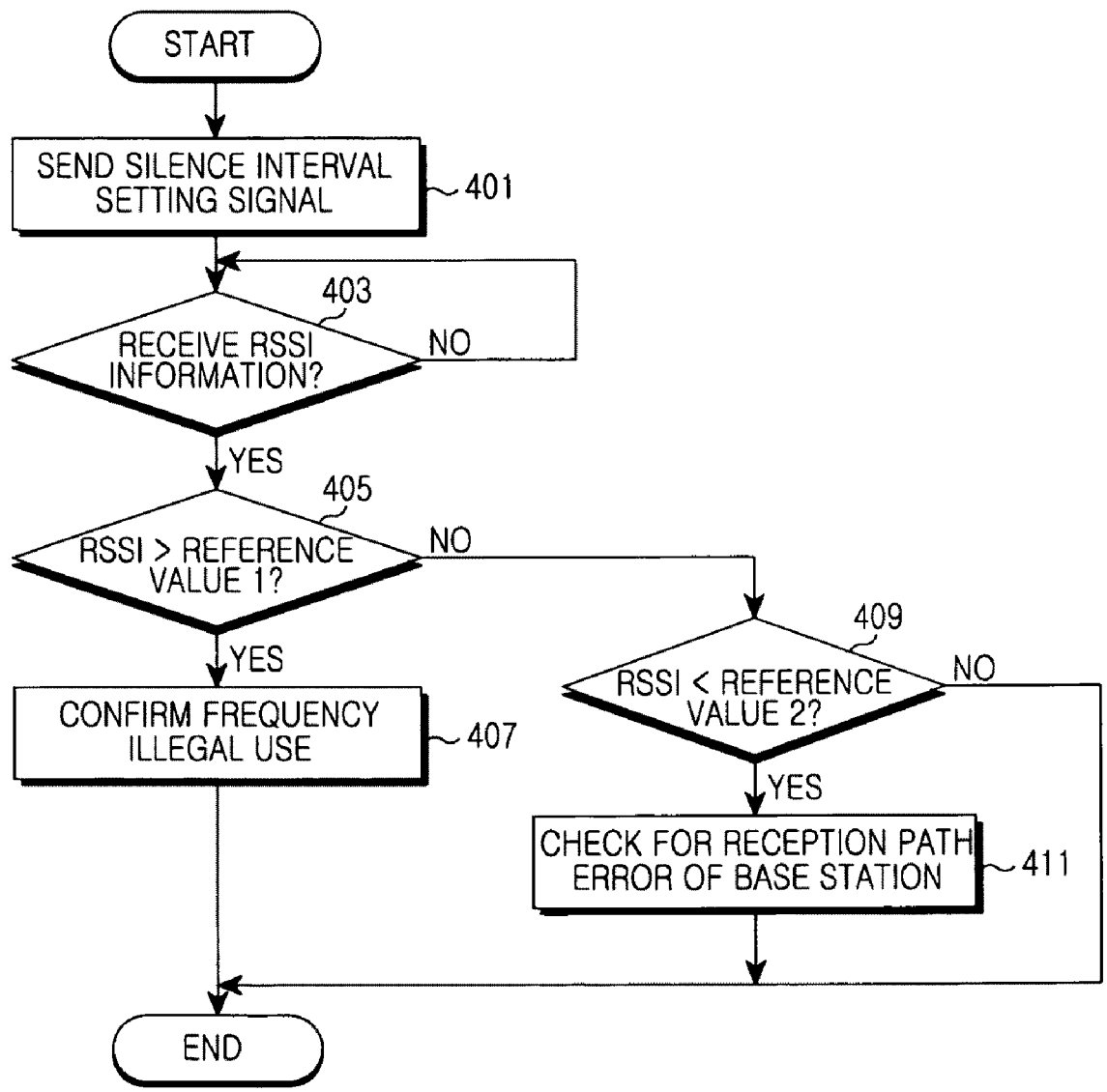
FIG. 4 illustrates a method of a system manager for determining whether the frequency band is illegally used according to an exemplary embodiment of the present invention.

Using the RSSI provided from the base station, the system manager can determine whether or not the frequency is illegally used as shown in FIG. 4.

FIG. 4 illustrates a method of the system manager for determining whether the frequency band is illegally used according to an exemplary embodiment of the present invention.

In step 401, the system manager transmits the silence interval setting signal including the silence interval setting information to at least one base station managed by the system manager. Herein, the silence interval setting signal includes at least one silence interval setting information of the silence interval start point information, the measurement report period information, the silence interval setting period information, and the measurement report repetition time information as shown in Table 1.

In step 403, the system manager determines whether the RSSI information is received from the base station.

Upon receiving the RSSI information from the base station, the system manager compares the RSSI with the first reference value to examine the frequency illegal use in step 405. Herein, the first reference value can be set to the sum of the sum noise and the reference variable. When the RSSI is greater than the first reference value in step 405, the system manager can confirm the presence of the user who illegally uses the frequency in step 407.

When the RSSI is less than or equal to the first reference value in step 405, the system manager confirms the absence of the user who illegally uses the frequency.

In step 409, the system manager compares the RSSI received from the base station in step 403 with the second reference value to check for the reception path error. Herein, the second reference value can be set to the difference of the sum noise and the reference variable.

When the RSSI is greater than or equal to the second reference value in step 409, the system manager recognizes the normal operation of the reception path of the base station which sends the RSSI. Thus, the system manager finishes this process.

By contrast, when the RSSI is less than the second reference value in step 409, the system manager recognizes that the reception path of the base station which sends the RSSI has error in step 411.

Next, the system manager finishes this process.

In this exemplary embodiment, the system manager examines the frequency illegal use and the reception path error every time it receives the RSSI from the base station.

Alternatively, the system manager may check the frequency illegal use and the reception path error using the average of the RSSI received from the base station over a certain time.

In this exemplary embodiment, the system manager examines the frequency illegal use using the RSSI provided from the base station and then checks for the error of the base station reception path. Alternatively, the system manager may check for the error of the base station reception path using the RSSI received from the base station and then examines the frequency illegal use. Alternatively, the system manager may concurrently examine the error of the base station reception path and the frequency illegal usage by use of the RSSI received from the base station.

As stated above, the base station schedules the silence interval according to the silence interval setting information provided from the system manager. The base station can constitute the frame as shown in FIG. 5 by scheduling the silence interval.

Figure 5:
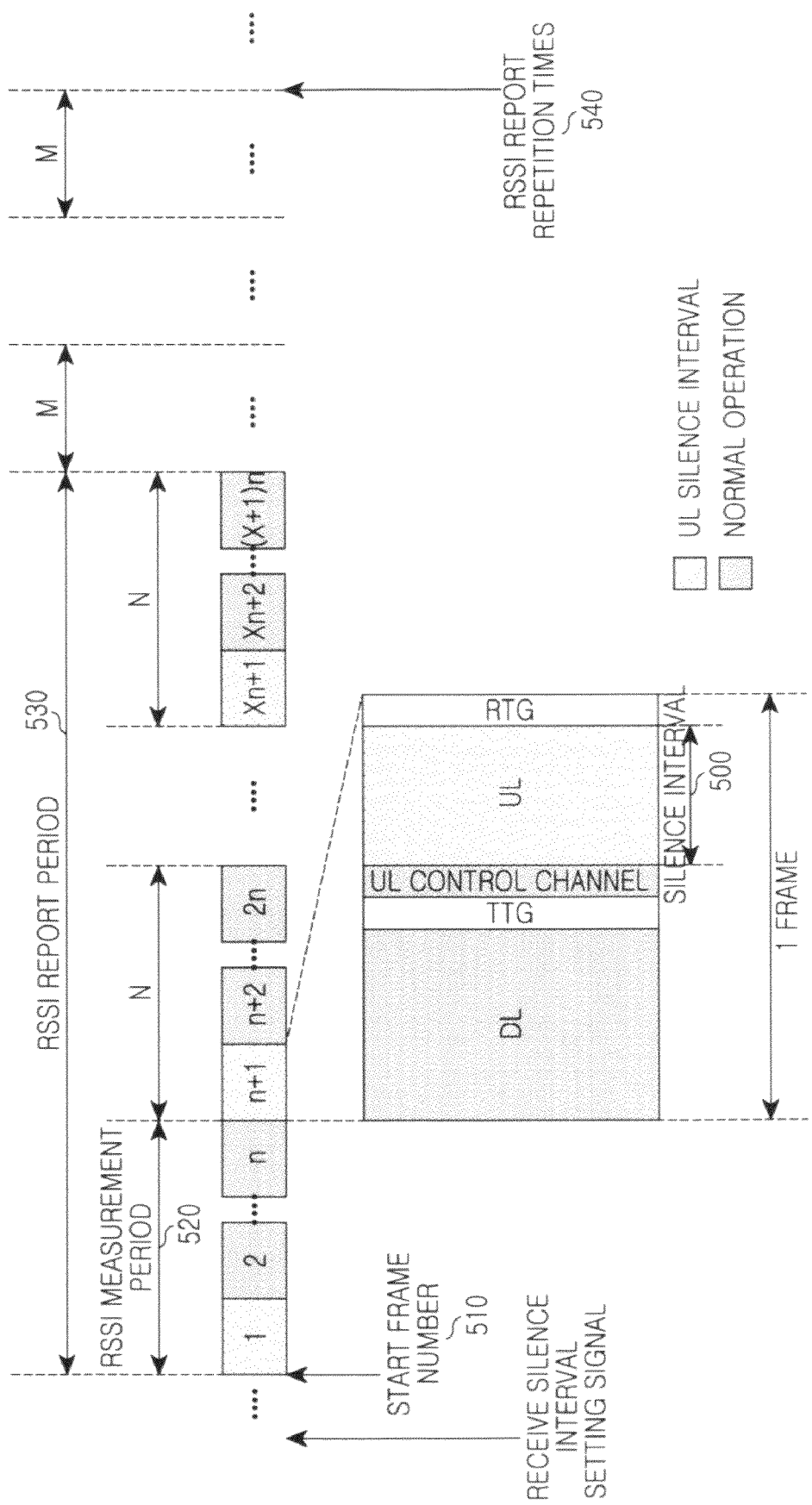
FIG. 5 illustrates a frame structure including a silence interval in the wireless communication system according to an exemplary embodiment of the present invention.

FIG. 5 depicts the frame structure including the silence interval of the wireless communication system according to an exemplary embodiment of the present invention.

According to the silence interval setting information of the silence interval setting signal, the base station defines the silence interval start frame 510, the silence interval setting period 520, the report period 530 of the RSSI, and the RSSI report repetition times 540 as shown in FIG. 5. For example, the base station sets the silence interval start frame 510 to the frame number 1 and the silence interval setting period 520 to n. The base station sets the period interval 530 of the RSSI to (X+1)n.

The base station does not allocate the resources of the uplink subframe defined as the silence interval, to the terminal. Accordingly, the uplink subframe defined as the silence interval is null. The base station sets only the burst region of the uplink subframe to the silence interval so that a control channel of the uplink subframe set to the silence interval normally operates.

The base station transmits to the system manager the RSSI information measured in the silence interval according to the report period 530 of the RSSI.

Now, descriptions explain a structure of the base station for measuring the uplink thermal noise power and the uplink interference power using the scheduled silence interval under the control of the system manager.

Figure 6:
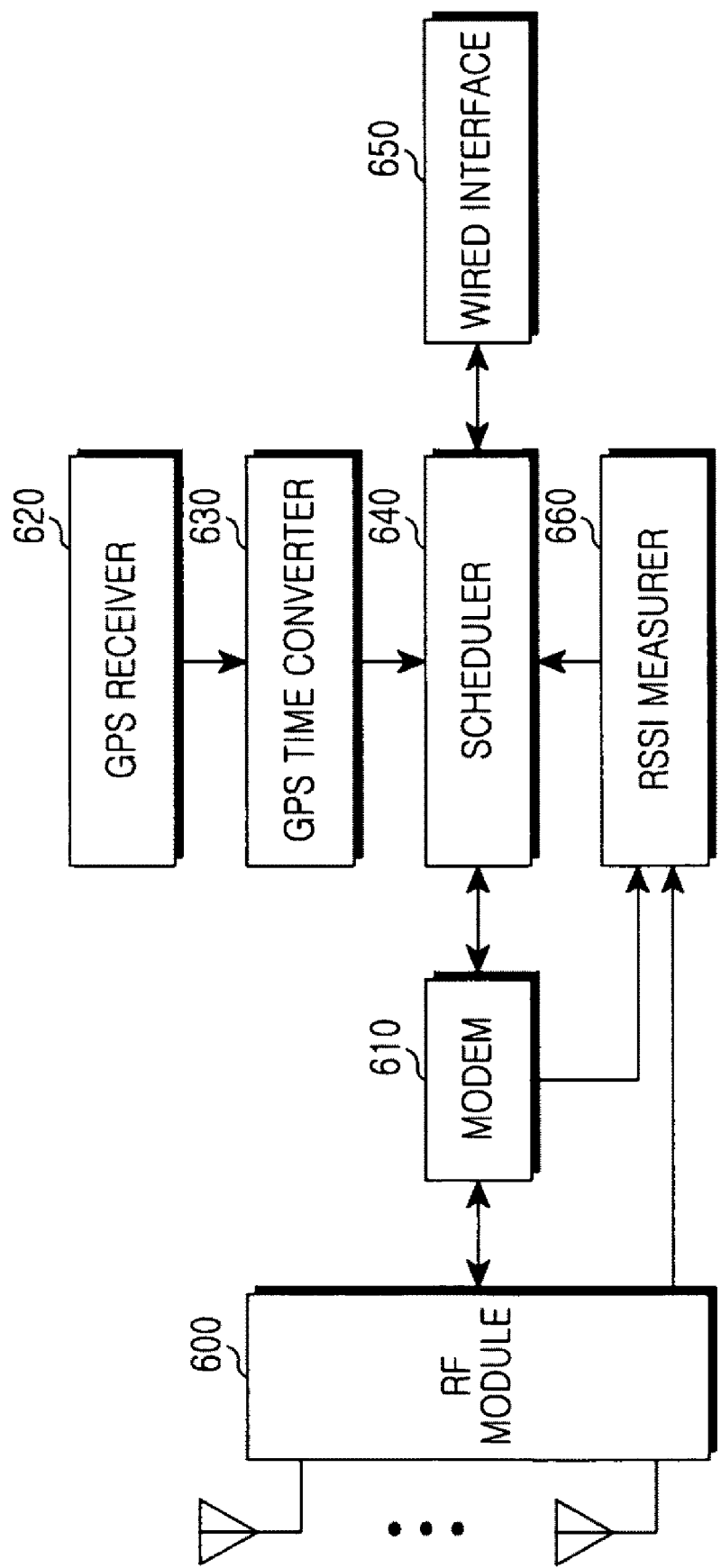
FIG. 6 illustrates a structure of the base station in the wireless communication system according to an exemplary embodiment of the present invention.

FIG. 6 illustrates a base station in the wireless communication system according to an exemplary embodiment of the present invention.

The base station of FIG. 6 includes a Radio Frequency (RF) module 600, a MODEM 610, a GPS receiver 620, a GPS time converter 630, a scheduler 640, a wired interface 650, and an RSSI measurer 660.

The RF module 600 processes RF signals transmitted and received over an antenna. For example, to transmit the signal, the RF module 600 converts the baseband signal output from the MODEM 610 to an RF signal and outputs via the antenna. To receive the signal, the RF module 600 converts the RF signal received via the antenna to the baseband signal.

The MODEM 610 modulates and demodulates the signals to transmit and receive. For example, to transmit the scheduling information, the MODEM 610 codes and modulates the scheduling information output from the scheduler 640 and sends to the RF module 600. In the signal reception, the MODEM 610 demodulates and decodes the signal output from the RF module 600.

The wired interface 650 transmits and receives the signals to and from the system manager over a wired network. For instance, the wired interface 650 receives the silence interval setting signal or the silence interval release signal from the system manager and forwards the received signal to the scheduler 640. The wired interface 650 sends the RSSI information measured by the RSSI measurer 660 in the silence interval, to the system manager.

The GPS receiver 620 receives a GPS signal from a GPS satellite.

The GPS time converter 630 converts the GSP time output from the GPS receiver 620 to a time form used by the base station. For example, the GPS time converter 630 converts the GPS time to the frame number.

The scheduler 640 selects the terminal to service through the scheduling and allocates the resources to the terminals.

The scheduler 640 schedules the silence interval according to the silence interval setting information provided from the system manager through the wired interface 650. For example, when receiving the silence interval setting signal from the wired interface 650, the scheduler 640 schedules the silence interval using the silence interval setting information of the silence interval setting signal and the time information output from the GPS time converter 630. Namely, the scheduler 640 schedules not to allocate the uplink resources of the silence interval to the terminals.

In the scheduling of the silence interval as above, the scheduler 640 determines the silence interval start frame, the silence interval setting period, the measurement report period, and the measurement report repetition time.

Next, the scheduler 640 controls the RSSI measurer 660 to measure the RSSI in the silence interval using the silence interval start frame and the silence interval setting period information. When the measurement report period arrives, the scheduler 640 transmits the RSSI information output from the RSSI measurer 660 to the system manager via the wired interface 650.

The RSSI measurer 660 measures the RSSI in the silence interval using the signal output from the RF module 600 under the control of the scheduler 640.

Although it is not illustrated here, the base station further includes a calculator for calculating RoT or IoT using the RSSI measured by the RSSI measurer 660 in the silence interval.

In this exemplary embodiment, the system manager examines the frequency illegal usage and the reception path error of the base station using the RSSI information provided from the base station.

Alternatively, the base station may check its reception path error using a particular RSSI in the silence interval. In this case, the base station further includes an error checker, which is not shown, for checking for the error of the reception path using the RSSI measured by the RSSI measurer 660 in the silence interval.

As set forth above, the base station of the wireless communication system utilizes the RSSI measured in the silence interval defined under the control of the system manager, as the uplink thermal noise power or the uplink interference power. Therefore, RoT and IoT can be calculated and the illegal usage of the frequency can be examined.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a base station for checking whether a frequency is illegally used in a wireless communication system, the method comprising:
  receiving, from a system manager, a silence interval setting signal comprising silence interval setting information;
  setting a silence interval in which a resource is not allocated to a terminal, using the silence interval setting information received from a system manager, and wherein the setting of the silence interval comprises:
    determining the silence interval in which the resource is not allocated to terminals, using a GPS time and the silence interval setting information provided from the system manager and
    determining an uplink interference power report period and the number of the report repetitions using the GPS time and the silence interval setting information;
  when the silence interval starts, measuring Received Signal Strength Indication (RSSI); and
  transmitting the RSSI to the system manager to examine at least one of a frequency illegal use and a reception path error using the RSSI,
  wherein the RSSI measured in the silence interval is recognized as an uplink interference power.

2. The method of claim 1, wherein the silence interval setting information comprises at least one of silence interval start point information, measurement report period information, silence interval setting period information, and measurement report repetition time information.

3. The method of claim 1, wherein the transmitting of the RSSI to the system manager comprises:
  determining whether the uplink interference power report period arrives; and
  when the uplink interference power report period arrives, transmitting the RSSI measured in the silence interval to the system manager.

4. The method of claim 1, further comprising:
  after measuring the RSSI in the silence interval, checking for error of a reception path using the RSSI.

5. The method of claim 1, further comprising:
  after setting the silence interval, determining whether a silence interval release signal is received from the system manager; and
  when the silence interval release signal is received, releasing the set silence interval.

6. The method of claim 1, further comprising:
  after measuring the RSSI, calculating RoT or IoT using the RSSI.

7. An apparatus of a base station for checking whether a frequency is illegally used in a wireless communication system, the apparatus comprising:
  a wired interface configured to transmit and receive signals to and from a system manager connected over a wired network, wherein the received signals comprise a silence interval setting signal, the silence interval setting signal comprising silence interval setting information;

a scheduler configured to set a silence interval in which a resource is not allocated to a terminal, using the silence interval setting information received from the system manager via the wired interface, and transmit Received Signal Strength Indication (RSSI) measured at an RSSI measurer in the silence interval, to the system manager;

the RSSI measurer configured to measure the RSSI when the silence interval arrives; and a GPS receiver configured to check a GPS time based on a GPS signal, wherein the scheduler is configured to determine the silence interval an uplink interference power report period and the number of report repetitions using the GPS signal output from the GPS receiver and the silence interval setting information provided via the wired interface, and wherein the RSSI measured in the silence interval is recognized as an uplink interference power.

8. The apparatus of claim 7, wherein the scheduler sets the silence interval using the silence interval setting information which comprises at least one of silence interval start point information, measurement report period information, silence interval setting period information, and measurement report repetition time information provided via the wired interface.

9. The apparatus of claim 7, wherein, when the uplink interference power report period arrives, the scheduler is configured to transmit the RSSI measured by the RSSI measurer in the silence interval, to the system manager via the wired interface.

10. The apparatus of claim 7, further comprising:
an error checker configured to check error of a reception path using the RSSI measured by the RSSI measurer in the silence interval.

11. The apparatus of claim 7, wherein, when receiving a silence interval release signal through the wired interface after setting the silence interval, the scheduler releases the set silence interval.

12. The apparatus of claim 7, further comprising:
a calculator configured to calculate RoT or IoT using the RSSI measured by the RSSI measurer in the silence interval.

13. A wireless communication system for examining whether a frequency is illegally used, comprising:

a system manager configured to transmit silence interval setting information to at least one base station;

the at least one base station configured to set a silence interval in which a resource is not allocated to a terminal, using the silence interval setting information, and when the silence interval arrives, measure Received Signal Strength Indication (RSSI) and transmit the RSSI to the system manager; and the system manager configured to examine at least one of frequency illegal use and a reception path error using the RSSI received from the at least one base station, wherein the RSSI measured in the silence interval is recognized as an uplink interference power, and wherein the at least one base station is configured to determine the silence interval, an uplink interference power report period, and the number of report repetitions using a GPS time and the silence interval setting information provided from the system manager.

14. The wireless communication system of claim 13, wherein the system manager transmits the silence interval setting information which comprises at least one of silence interval start point information, measurement report period information, silence interval setting period information, and measurement report repetition time information, to the at least one base station.

15. The wireless communication system of claim 13, wherein, when the uplink interference power report period arrives, the at least one base station is configured to transmit the RSSI measured in the silence interval to the system manager.

16. The wireless communication system of claim 13, wherein, when determining that the silence interval of the at least one base station is unnecessary, the system manager is configured to transmit a silence interval release signal to the at least one base station, and the at least one base station is configured to release the silence interval according to the silence interval release signal.

17. The wireless communication system of claim 13, wherein the at least one base station calculates RoT or IoT using the RSSI measured in the silence interval.

* * * * *